H. E. REEVE.

MECHANISM FOR GONGS AND THE LIKE.

APPLICATION FILED DEC. 16, 1908.

12,914. Reissued Feb. 2, 1909.

3 SHEETS—SHEET 1.

Witnesses
J. Clyde Kipley.
E. Bradford.

Inventor
Henry E. Reeve.
By his Attorney
[signature]

THE NORRIS PETERS CO., WASHINGTON, D. C.

H. E. REEVE.

MECHANISM FOR GONGS AND THE LIKE.

APPLICATION FILED DEC. 16, 1908.

12,914.

Reissued Feb. 2, 1909.

3 SHEETS—SHEET 2.

Witnesses

J. Clyde Kipley.

E. Bradford

Inventor

Henry E. Reeve.

By his Attorney

[illegible]

THE NORRIS PETERS CO., WASHINGTON, D. C.

H. E. REEVE.

MECHANISM FOR GONGS AND THE LIKE.

APPLICATION FILED DEC. 16, 1908.

12,914. Reissued Feb. 2, 1909.

3 SHEETS—SHEET 3.

Witnesses
J. Clyde Kipley.
E. Bradford

Inventor
Henry E. Reeve.
By his Attorney
[illegible]

THE NORRIS PETERS CO., WASHINGTON, D. C.

UNITED STATES PATENT OFFICE.

HENRY E. REEVE, OF NEW YORK, N. Y.

MECHANISM FOR GONGS AND THE LIKE.

No. 12,914. Specification of Reissued Letters Patent. Reissued Feb. 2, 1909.

Original No. 868,221, dated October 15, 1907, Serial No. 341,033. Application for reissue filed December 16, 1908. Serial No. 467,914.

*To all whom it may concern:*

Be it known that I, HENRY E. REEVE, a citizen of the United States, residing at the city of New York, borough of Brooklyn, county of Kings, State of New York, have invented certain new and useful Improvements in Mechanism for Gongs and the Like, of which the following is a full, clear, and exact description.

My invention relates to electro-mechanical gongs.

The principal object of the invention is to provide a reliable and efficient mechanism by which a powerful stroke may be effected and which may be released electrically.

Another object is to prevent injury to the mechanism in its ordinary operation.

Another object is to minimize the wear resulting from ordinary use.

Another object is to minimize the power required to operate the mechanism.

The invention consists in improvements, the principles of which are illustrated in the accompanying three sheets of drawings.

The relation between the gong and the striking apparatus, and the construction of the latter, is of importance, as will be more fully understood from the following specification.

Figure 1:
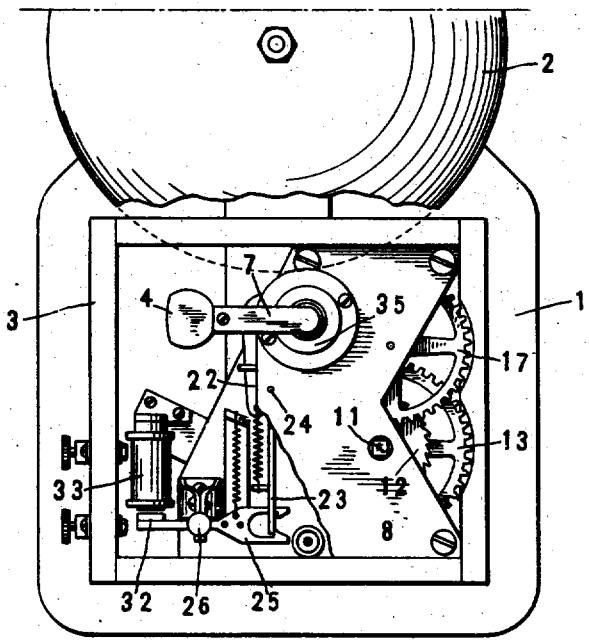
Figure 2:
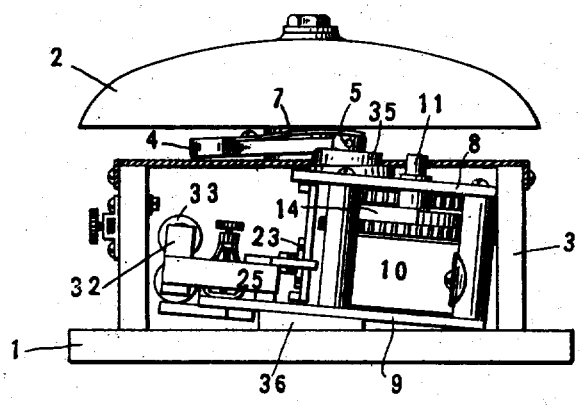
Figure 3:
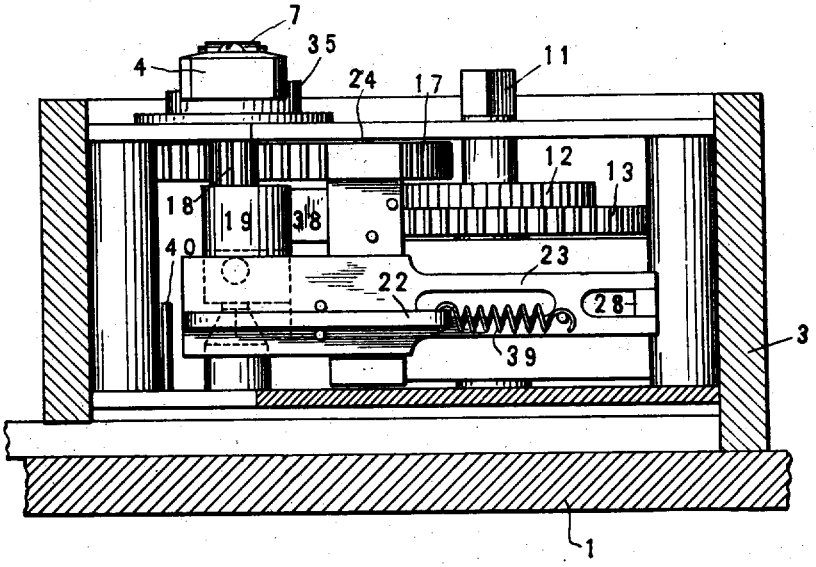
Figure 5:
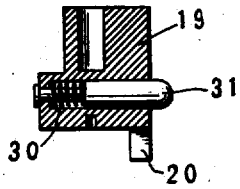
Figure 6:
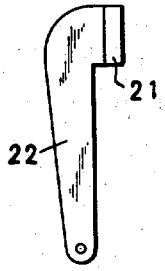
Figure 4:
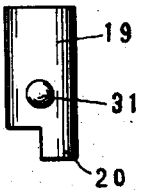
Figure 7:
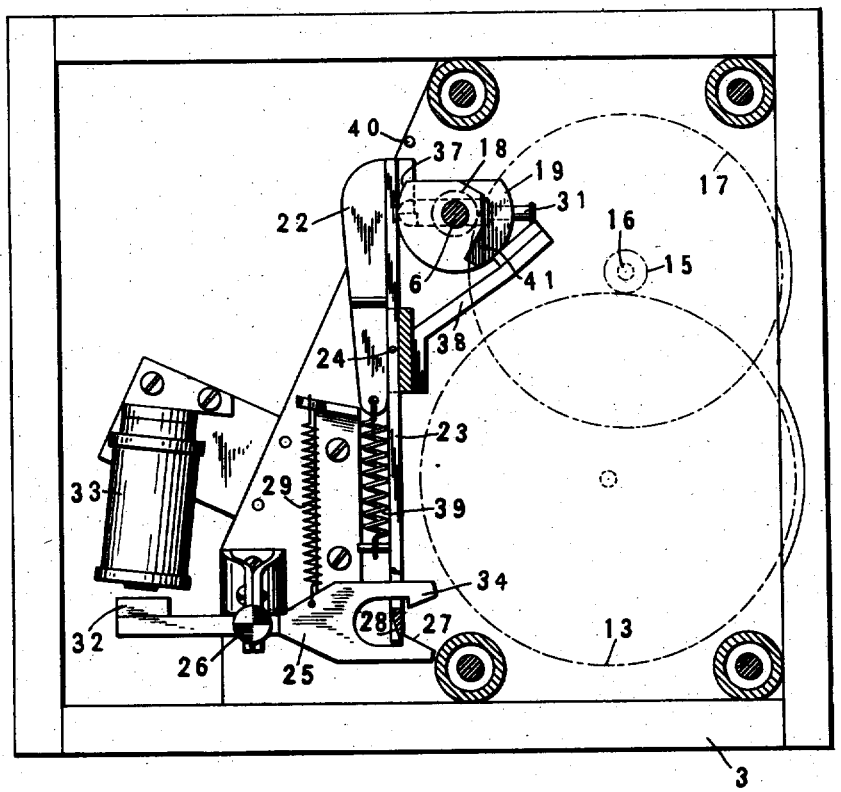
Figure 8:
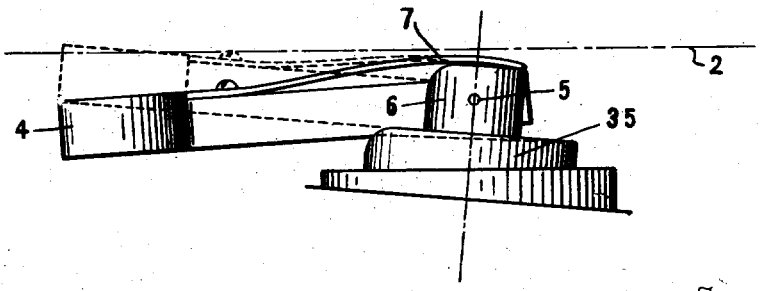

Figure 1 shows a fragment of a gong, together with the striking mechanism and supporting base and protecting case, the cover being removed. Fig. 2 is an end elevation, one side of the case being removed to show the interior mechanism. Fig. 3 is a sectional view taken at right angles to the view shown in Fig. 2, but omitting the gong. Fig. 4 is a detail of the main hub of the striking mechanism. Fig. 5 is a sectional view of the same, taken on a plane at right angles to the view in Fig. 4. Fig. 6 is a detail view of part of the stop device. Fig. 7 is a plan view of the striking mechanism similar to Fig. 1, but on a larger scale, parts of the driving train being shown dotted. Fig. 8 illustrates the hammer action on an enlarged scale.

The base 1 is adapted to be secured to any suitable form of support, and carries the ordinary gong 2 which is customarily parallel to the base. The case 3 surrounds portions of the mechanism to prevent the entrance of dirt and injury as well as tampering with the parts.

The hammer 4 is hinged at 5 on an axis at right angles to the axis of the shaft 6 and normally pressed downwardly by the spring 7. The hammer shaft 6 is pivotally mounted in the top plate 8 and bottom plate 9 of a frame which is supported in the case 3. The main spring 10 has the outer end secured to the frame and the inner end secured to the winding shaft 11, which also carries the ratchet 12. The main driving wheel 13 is loosely mounted on the shaft 11 and carries a spring-pressed pawl 14, which permits the spring to be wound up by rotation of the shaft 11, but causes the tension of the spring to transmit movement to the driving wheel 13. Wheel 13 meshes with pinion 15 on shaft 16, which shaft carries gear 17 which meshes with pinion 18 on the hammer-shaft. This is the ordinary winding and driving mechanism.

The hub-like member 19 forms a part of the hammer shaft 6 and has a shoulder 20 which in the normal position of rest bears against the shoulder 21 of the stop member 22, so that the shaft and hammer are held from rotation. The stop member 22 is carried by a lever 23 pivoted at 24. The latch member 25 is pivoted at 26 on an axis parallel to the axis of the lever 23, and has a tooth 27 normally engaging the end of the lever and holding it stationary. The latch member 25 is preferably under the tension of a spring 29, while the stop lever 23 is held in its normal position yieldingly by the spring 30, which acts through the medium of the plunger 31 carried by the hub 19.

The latch member carries an armature 32 adapted to be attracted by the electro-magnet 33 when it is desired to release the hammer for the purpose of sounding the gong. It will be noted, however, from an inspection of Fig. 7, that when the armature 32 is attracted toward the magnet 33 and the end 28 released from the hook 27, the hook 34 is interposed in the path of movement of the end 28, so that the stop lever 23 has as yet no substantial movement, although the lever is under pressure of spring 30. When the magnet is deënergized, however, the spring 29 pulls the armature and latch member so as to release the end 28 from the hook 34 and cause the incline of the hook 27 to engage the incline of the end 28 and permit the stop lever 23 to be tilted in an anticlockwise direction by the action of the spring 30 and plunger 31. This disengages the shoulder 21 of the stop 22 from the shoulder 20 of the hammer-shaft hub 19, so that the hammer-shaft is free to rotate and swing the hammer in a clockwise direction (as viewed in Fig. 1.)

It will be noted that in the position of rest the hammer 4 is normally below the edge of the gong 2, so that when it begins to rotate it passes under the edge of the gong. If the hammer were permitted to rotate freely under such conditions, it is apparent that it would never strike the gong. In order to accomplish the striking action a stationary cam 35 is provided, which tends to raise the hammer as it rotates, so that it will strike the edge of the gong and then be permitted to fall into the position shown in Fig. 2, at which time the shoulder 20 engages the stop 22. In order that the upward swinging movement of the hammer may be as gradual as possible, and so as to minimize the force required, so as to avoid wear of the parts, I have inclined the hammer-shaft 6 so that the hammer may begin to rise on the cam almost as soon as it begins to rotate and in the arrangement shown, while it is underneath the gong and still avoid contact with the edge of the gong as the hammer swings outwardly. I have found it economical and satisfactory to incline the entire frame and driving and release mechanism carried thereby relative to the base 1 in any suitable manner, for instance, by means of a wedge or support 36. Fig. 8 shows the cam with the hammer in full lines in the position of rest, and in dotted lines in the striking position.

It will be noted that when the hub 19 has rotated far enough to disengage the plunger 31 from the stop lever 23, the lever is entirely free from any tension. The lever is, therefore, substantially free to swing. As the hub rotates clockwise, the surface 37 strikes the tail 38 of the stop lever and swings the lever back into its normal position where the end 28 is engaged or latched by the tooth 27 of the latch member 25. Continued movement of the hub 19 brings the plunger 31 into engagement with the back of the stop lever 23, so that the plunger is forced slightly inward and begins to press against the stop lever. The shoulder 20 of the hub then strikes against the stop shoulder 21 and brings the hammer and hammer-shaft to rest. In order to accomplish this without shock, I have mounted the stop 22 so that it may slide on the lever 23, but have restrained its action by a spring 39, so that the stop action is in effect yielding instead of abrupt. To preclude any possibility of excessive movement of the stop, and consequent accidental release of the hammer, I may provide a stationary abutment 40 against which the stop 22 may strike to limit its movement when the shoulder 20 of the hub 19 engages the stop shoulder 21. It is however, impossible for such action to take place when the gong is in position.

The surface 37 of the hammer shaft hub prevents the stop lever from being moved by the action of plunger 31 when returning to its normal position, even if the stop lever happens to have been released from the latch a second time during the first stroke of the hammer. The cut back portion, 41, however, permits the lever tail to move for a second stroke when the first stroke is completed.

It is obvious that the shape and size of the gong is unimportant, and that the inclination of the hammer-shaft is relative to a perpendicular to the plane of the edge of the gong. The point of contact of the hammer on the gong is also immaterial.

One of the particular advantages of this type of mechanism is the powerful stroke obtained by giving the hammer a complete rotation as distinguished from a mere vibration or oscillation. The full momentum of the hammer and shaft is thus added to the power of the driving spring so as to produce a sharp, clear tone of the gong or bell. Even when the gong has been removed for any reason, the hammer in spite of its great momentum is brought to rest without injury to the mechanism by the yielding stop which takes up the entire momentum of the striker. This is of especially great importance in this type of mechanism with the rotating hammer.

What I claim is:

1. An apparatus of the character described, comprising a gong, a hammer, a shaft therefor, having its axis inclined relatively to a perpendicular to the plane of the gong, and a cam for supporting said hammer, the supporting face of said cam having a gradual inclination through substantially its entire periphery.

2. An apparatus of the character described, comprising a gong, a hammer, a shaft therefor having its axis inclined relative to a perpendicular to the plane of the gong, driving mechanism therefor, a stop lever for said mechanism and a yielding stop carried by said lever for bringing the hammer to rest.

3. An apparatus of the character described, comprising a gong, a hammer, a shaft therefor having its axis inclined relative to a perpendicular to the plane of the gong, striking mechanism, a stop lever therefor, a yielding stop carried by said lever, and an abutment for preventing excessive movement of said stop.

4. An apparatus of the character described, comprising striking mechanism, including a gong, a hammer, a shaft therefor having its axis inclined relative to a perpendicular to the plane of the gong, a pivoted lever, a yielding stop carried thereby, a pivoted latch for said lever and an electro-magnet for operating said latch.

5. An apparatus of the character described comprising striking mechanism, including a hammer and shaft therefor, a hub on said shaft, a stop lever, a latch therefor, a cam on said hub, and a spring-pressed plunger carried by said hub, said cam and plunger coöperating with said lever.

6. An apparatus of the character described, comprising striking mechanism including a hammer and shaft therefor, a hub on said shaft, a stop lever, a latch therefor, a tail on said stop lever coöperating with said hub, said hub being adapted to hold said lever in engagement with said latch throughout a portion of the hub's rotation.

7. An apparatus of the character described, including a hammer shaft, a hub thereon, a plunger carried therein, a stop lever engaging said plunger, and means for releasing said stop lever.

8. An apparatus of the character described, including a rotatable hub, a cam thereon, a lever, a tail on said lever coacting with said cam and a stop yieldingly carried by said lever, and adapted to be engaged by said hub.

9. An apparatus of the character described, including a rotatable hub, a shoulder thereon, a lever having a yielding stop, adapted to be engaged by said shoulder on the hub, a spring-pressed plunger carried by said hub normally pressing against said lever and means for returning said lever to the engaged position.

10. An apparatus of the character described, comprising a gong, a pivoted hammer, a shaft therefor having its axis inclined relative to the axis of the gong, said hammer shaft being adapted to rotate upon its axis to cause the hammer to strike the gong.

11. An electro mechanical gong mechanism comprising, a rotatable shaft and hammer, means for giving complete rotation to said shaft and hammer, a yielding stop device for checking said shaft and hammer on the completion of a rotation and means for disengaging said stop device.

12. An electro mechanical gong mechanism comprising a rotatable shaft and hammer, mechanism for giving complete rotation to said shaft and hammer, means for bringing the hammer to rest yieldingly at the completion of a rotation, said means including a yielding part and means for releasing the parts to permit the hammer to rotate.

13. An electro mechanical gong mechanism comprising, a rotatable hammer shaft, a stop lever, a spring carried by said shaft and normally tending to press said stop lever away from said shaft, a latch for said stop lever and electro magnetically operated means for releasing said latch.

14. An electro mechanical gong mechanism comprising, a rotatable hammer shaft and hammer, means for rotating said shaft and hammer, a stop lever for stopping said shaft and hammer, means carried by said shaft and tending to press said stop lever away from said shaft, a latch member normally holding said stop lever, and an electro magnet for moving said latch member.

15. An electro mechanical gong mechanism comprising, a rotatable hammer, a stop device therefor, a latch for said stop device, means for releasing said latch and means rotatable with said hammer for forcing said stop device into engagement with said latch and means rotatable with said hammer for disengaging said stop device.

16. An electro mechanical gong mechanism comprising, a rotatable hammer shaft and hammer, means for giving complete rotation to said shaft and hammer, a stop lever for stopping said shaft and hammer, means tending to press said stop lever away from said shaft, a latch member normally holding said stop lever, an electro magnet for moving said latch member and means for forcing said lever back into engagement with said latch member as the shaft revolves.

17. An electro mechanical gong mechanism comprising a gong, a rotatable shaft and hammer, means for giving complete rotation to said shaft and hammer, a cam for bringing said hammer into contact with said gong as the hammer rotates, a yielding stop device for said hammer and means for disengaging said stop device.

HENRY E. REEVE.

Witnesses:
ROBT. S. ALLYN,
E. BRADFORD.